Feb. 4, 1941.  J. S. EASTMAN  2,230,239
TANK
Filed Feb. 14, 1938
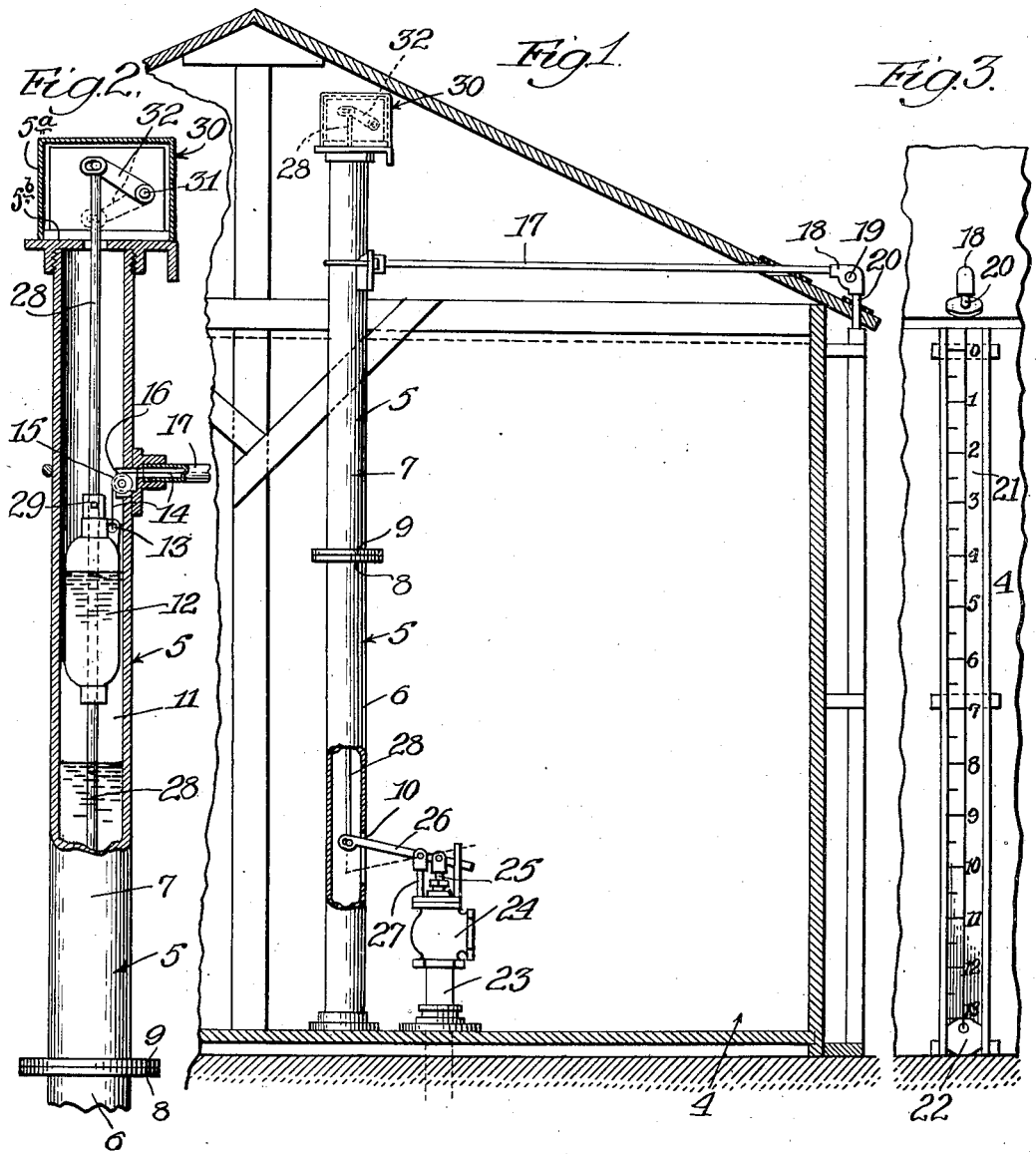
Inventor:
Joseph S. Eastman,
By Britton, Wiles, Davies, Hirschl & Dawson,
Att'ys.

Patented Feb. 4, 1941

2,230,239

UNITED STATES PATENT OFFICE 2,230,239

TANK

Joseph S. Eastman, Chicago, Ill., assignor to T. W. Snow Construction Company, Chicago, Ill., a corporation of Illinois Application February 14, 1938, Serial No. 190,481

5 Claims. (Cl. 137—68)

My invention, as to certain of the phases thereof, relates to improvements in tanks containing liquid, as for example water, subject to freezing at the temperature to which it is subjected when exposed to winter weather, as for example in the case of water tanks for supplying water to rolling stock on railway tracks; and more especially to tanks comprising, as a feature thereof, a float operating responsive to the level of the body of the liquid in the tank and serving to perform any one or more of many purposes.

Such structures as hitherto provided present the objection of the freezing of the float in the top of the body of liquid in the tank during very cold weather and also the liability of freezing of the flexible element, as for example a cable, connected therewith, to its guides, in the case of many kinds of float-controlled installations, as for example where the float controls the position of a water-level indicator device.

My object, in this connection is to provide improvements in float-equipped tanks to the end that the freezing of the liquid at the upper portion of the body thereof will not interfere with the proper functioning of the float and likelihood of a flexible element connected with the float, when such is employed, becoming frozen in its guides, will be avoided or reduced to the minimum.

The invention also relates, as to another phase thereof, to the dual functioning of a float in a tank, such as that above referred to, for controlling or regulating a plurality of elements; it being another object of my invention to provide for such dual functioning particularly when one of the functions performed is the control of a liquid level indicator device.

The invention also relates to a tank having a liquid-level indicator device and a liquid inlet control valve; my object in this connection being to provide a mechanism whereby such elements may be controlled by a single float.

The invention presents other phases, my objects in connection with which, are to protect the float against the deleterious action of corrosive liquids in the tank in connection with which the float may be used; to provide for the free operation of the float in an apparatus in which heavy viscous liquids are used; to provide, in an apparatus employing electrical contacts, for the shielding of the contacts against access thereto of vapors, especially hot vapors, from the liquid in the tank; and other objects as will be manifest from the following description.

Referring to the accompanying drawing:

Figure 1 is a fragmentary view in sectional elevation of a water tank having float-controlled mechanism and embodying my invention.

Figure 2 is an enlarged, partly sectional, view of a portion of the float-controlled mechanism of Fig. 1; and Figure 3, a fragmentary view in side elevation of the tank showing water-gage means with which it is equipped and comprising one of the means shown as controlled by the float in the tank.

Referring to the construction shown, it comprises a tank proper 4 such for example as would be installed adjacent a railway track for supplying the water therefrom to rolling stock on the track; the tank in practice being equipped with a controllable outlet (not shown) in accordance with common practice.

Rising from the bottom of the tank is a pipe 5 shown as, and preferably, comprising two separate sections 6 and 7 arranged one above the other in vertical alignment, connected together at their flanges 8 and 9 and rising to a height above the maximum water level in the tank 4; the pipe 5 having an opening 10 in its side wall below the point at which freezing of the water in the tank may occur in the normal use of the tank equipment.

The water maintained in the tank extends upwardly in the pipe 5 at all times above the opening 10 and on the column of water thus existing in the pipe is provided a body 11 of liquid which is non-freezing at the lowest temperatures to which it is subjected, in use, by the weather, a desirable liquid for this purpose being oil which floats on the column of water referred to.

Extending into the body 11 of non-freezing liquid is a float 12 buoyed by this liquid.

The float 12 is shown as performing three functions in the particular construction shown, namely, that of controlling the position of a gage device to indicate at all times the height of the water in the tank; controlling an inlet valve for replenishing the tank as water is withdrawn therefrom; and controlling mechanism for pumping a chemical water treating solution from a tank thereof (not shown) to a water treating tank (also not shown) as for example where it is desired that the supplying of such solution be timed with the lowering of the water in the tank 5 to a predetermined level. Where, however, the water is not to be treated, the inlet valve would be omitted, and the inlet to the tank, provided with the float, would be connected with the raw water supply, with a pump controlled by the float for pumping the raw water into the tank.

To the end of controlling a gage device the float 12 is shown as connected at 13 with a flexible element 14, as for example a cable, the cable 14 extending over a pulley 15 journalled in an opening 16 in the side wall of the pipe 5 and thence through a pipe 17 sealed to the pipe 5 and thence extending through a sealed opening in the top of the tank 4, to a hollow elbow connection 18 closed except at its ends. The elbow 18 has journalled therein on a shaft 19 a pulley like the pulley 15 over which the cable 14 extends and thence passes downwardly through a pipe 20 across the face of a grooved gage board 21, the end of the cable 14 being connected with a gage block 22 vertically slidably guided on the gage board in accordance with common practice.

In connection with the float performing the function of controlling the flow of water to the tank 4, the tank is shown as provided with an inlet pipe 23 which would lead to a suitable supply of water. Connected with this pipe is a valve device 24 of any desirable construction, automatically movable to open position and shown as operated by a sliding stem 25 connected with one end of a lever 26 pivoted to an upright 27 on the casing of the valve.

Extending upwardly through the float 12 is a vertical rod 28 having a stop, or tappet, 29 secured thereto above the float and adapted to be engaged by the float for lifting the rod and rocking the lever 26 to the full line position shown to shut off the flow of water to the tank when the desired predetermined level of water in the tank is attained. As the water lowers in the tank the float descends thereby permitting the rod 28, by reason of its weight, supplemented in the particular construction shown by the action of the valve 24 tending to automatically move to open position, to lower with the float, whereupon the valve 24 opens and water is supplied to the tank to replenish it.

Should the valve 24 fail to open in the lowering of the float as stated, the float will eventually lower to a point where it engages the lever 26 and by its weight will move the valve 24 to open position.

In connection with the float performing the function of controlling the starting and stopping of a pump as for example for the purpose above stated, the tank is shown as provided with an electric switch device represented generally at 30, of any well known construction, for controlling a motor (not shown) for driving a pump (not shown), the switch device 30, preferably of the snap action type, comprising a rock shaft 31 by which the contacts of the switch are controlled for opening and closing the circuit of the motor referred to. The rock shaft 31 has a crank arm 32 to the outer end of which the rod 28, at its upper end is connected. In the full line position of the switch arm 32 as shown in Fig. 2, to which position it is moved by the float 12 forcing the rod 28 upwardly through its engagement with the stop 29, the switch would be open, and in its dotted position, closed. Consequently when the float 12 and rod 28 lower from the position shown by the withdrawal of water from the tank 4 the switch 30 is moved, by the rod 28, to closed position to start the pump referred to, the switch 30 snapping to "on" and "off" position when its crank arm 32 is moved past center.

The showing of the float 12 as performing the three functions referred to is for the purpose of illustration only. The float may be used to perform other functions, or any one of the three functions above described or any desired combinations of these functions, and still permit of the availing of that feature of my invention whereby the float, by reason of its location in a body of non-freezing liquid floating on a column of water in the tank, cannot become frozen in place, and thus is free to function even when the upper part of the body of water in the tank becomes frozen.

In the arrangement shown provision is made for shielding the float and the flexible medium 14 from access thereto of the excess moisture of water vapor existing in the tank above the body of water therein thereby greatly minimizing the possibility of these parts becoming frozen in place and affecting the proper functioning thereof. This is accomplished, in the particular construction shown, by providing the housing pipe 17, the body 11 of non-freezing liquid, and the pipe 5 the upper end of which latter is closed by a hood 5a enclosing the switch mechanism 30 and resting on top of a cap-plate 5b at the upper end of the pipe 5 and through which the rod 28 loosely extends, it being noted that the pipe 5 is free of water vapor above the body 11 of non-freezing liquid.

It may be further stated that the movement of the rod 28 in either direction by the arrangement shown is in the nature of a snap action due to the delayed response of the float to the rising and lowering of the body 11 of non-freezing liquid, by reason of the inertia of the movable parts; such movement of the rod being particularly desirable as it is of advantage to operate the valve 24 and switch 30 by a quick action.

It will be noted that the provision of the rod 28, with its upper stop 29, in combination with the float 12, inlet valve mechanism 24 and the water-level indicator device, permits of the desirable control of the inlet valve while permitting the float to function throughout a wide range of movement for the desired control of the indicator device.

The feature of providing a body of liquid superposed on the liquid in the pipe 5 of a lower specific gravity than the liquid in this pipe and in which the float extends, has uses within my invention in addition to those above described. Thus by providing this superposed body of any desirable non-corrosive liquid, it will serve to prevent corrosion of the float when the liquid in the tank is of a corrosive nature: Where the liquid in the tank is of such heavy viscosity as to interfere with the proper operation of the float if extending into this liquid, the provision of the superposed body of liquid in the pipe and of such light viscosity as not to interfere with the proper operation of the float, will be of advantage: Furthermore, the feature of the body of liquid superposed on the liquid in the pipe 5 and in which the float extends serves, in connection with electrical apparatus, having contacts, as for example in the case of the electrical apparatus above described, to prevent vapor from the liquid of the column in the pipe 5, rising to the contacts and impairing them if the vapor is of a corrosive nature, or otherwise interfering with their proper operation, particularly when the liquid of the column is such that hot corrosive vapor emanates therefrom.

As will be understood, the matter of providing against freezing, as explained in connection with the above described apparatus as applied to water tanks, may or may not be a factor in connection with certain of these other uses, but where it is, the superposed body of liquid in the pipe should be of a non-freezing character.

While I have illustrated and described a particular construction embodying my invention and recited several uses to which it may be put, I do not wish to be understood as intending to limit the invention thereto as the construction shown may be variously modified and altered and the invention embodied in other forms of structure and put to other uses without departing from the spirit of the invention; and in this connection it may be stated that, in so far as certain features of my invention are concerned, such may be incorporated in a structure wherein no provision is made for preventing the freezing in place, under freezing conditions, of either the float or the flexible element such as is used for operating a water-level indicator device.

What I claim as new and desire to secure by Letters Patent is:

1. The combination of a tank for liquid capable of freezing, a pipe extending upwardly in the tank surrounded by the liquid therein and in such communication therewith that the pipe contains a column of the liquid, a body of non-freezing vapor-sealing liquid floating on the top of said column, a float-controlled mechanism the float of which is in said body of non-freezing liquid, said mechanism comprising an element to be controlled by said float and means by which movement of the float controls said first-named element, and means for preventing access of vapor above the liquid in the tank to said float and said first mentioned means.

2. The combination of a tank for liquid capable of freezing, a pipe extending upwardly in the tank surrounded by the liquid therein and in such communication therewith that the pipe contains a column of the liquid, a body of non-freezing liquid of less specific gravity than the liquid of said column, floating on the top of said column and acting as a vapor-seal for the tank liquid in the pipe, a float-controlled mechanism the float of which is in said body of liquid, said mechanism comprising an element to be controlled by said float and a connection by which movement of the float controls said element, said pipe above said body of liquid being closed against access thereto of vapor above the liquid in the tank, and means connected with said pipe for shielding said connection element against access thereto of such vapor.

3. The combination of a tank for liquid, inlet valve mechanism, a movable rod controlling said valve mechanism, a float in the tank slidable on said rod and operative responsive to the rise and fall of the liquid in the tank, means whereby the float in moving upwardly moves said rod for closing said valve mechanism, said valve mechanism moving to open position upon lowering said rod, and means whereby the float in moving downwardly on said rod forces said rod downwardly to open said valve mechanism should said valve mechanism fail to open in the initial downward movement of said float.

4. Apparatus of the class described comprising, in combination: a tank, a stand pipe immersed in liquid in said tank with the interior of the pipe adjacent its lower end in communication at a slot therein with the interior of the tank; an automatically opening inlet valve actuating means for said inlet valve having an upper stop and a lower stop; said actuating means including a control lever projecting through said slot and a control rod operatively connected to said valve and extending in said pipe to a point above the maximum level of liquid in the tank; a float slidable on said rod between said upper stop and said lower stop, said upper stop being disposed adjacent said maximum level; whereby slight lowering of liquid level allows said valve to open assisted by weight of said rod and contact of the float with said low limiting means forces the rod downwardly to open the valve should it fail to open in the initial downward movement of the float.

5. In apparatus according to claim 4, said pipe being vapor-tight at the upper end, and an oil, vapor-seal floating on the liquid in said pipe.

JOSEPH S. EASTMAN.